United States Patent
Junger et al.

(10) Patent No.: US 7,203,776 B2
(45) Date of Patent: Apr. 10, 2007

(54) METHOD OF DATA TRANSMISSION AND A TRANSMISSION AND RECEPTION DEVICE THEREFOR

(75) Inventors: Andreas Junger, Reutlingen (DE); Rainer Moritz, Filderstadt (DE); Uwe Lueders, Reutlingen (DE); Wolfgang Thuss, Hemmingen (DE); Berthold Elbracht, Reutlingen (DE); Jens Haensel, Leonberg (DE); Wolfgang Kostorz, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 127 days.

(21) Appl. No.: 10/320,023

(22) Filed: Dec. 16, 2002

(65) Prior Publication Data

US 2003/0172204 A1    Sep. 11, 2003

(30) Foreign Application Priority Data

Dec. 14, 2001  (DE) ................................. 101 61 672

(51) Int. Cl.
   *G06F 3/00* (2006.01)
   *G06F 13/00* (2006.01)

(52) U.S. Cl. .................... 710/57; 710/52; 710/106; 710/310

(58) Field of Classification Search ............... 710/52, 710/62, 63, 34, 35, 38, 72, 106, 310
See application file for complete search history.

(56) References Cited

U.S. PATENT DOCUMENTS

| | | | | |
|---|---|---|---|---|
| 4,958,277 | A | * | 9/1990 | Hill et al. ..................... 710/52 |
| 5,651,113 | A | * | 7/1997 | Lin et al. ..................... 714/56 |
| 5,793,993 | A | * | 8/1998 | Broedner et al. ........... 710/106 |
| 5,805,922 | A | * | 9/1998 | Sim et al. ..................... 710/5 |
| 6,604,156 | B1 | * | 8/2003 | Slivkoff et al. ............... 710/57 |
| 6,691,183 | B1 | * | 2/2004 | Ryan, Jr. ..................... 710/35 |
| 6,735,657 | B1 | * | 5/2004 | Falk et al. ................... 710/305 |
| 6,771,659 | B1 | * | 8/2004 | Parantainen et al. ........ 370/466 |
| 2002/0133662 | A1 | * | 9/2002 | Cheung ........................ 710/310 |
| 2002/0150045 | A1 | * | 10/2002 | Vogtmeier et al. .......... 370/229 |

FOREIGN PATENT DOCUMENTS

DE    101 10 042    10/2002

* cited by examiner

*Primary Examiner*—Glenn A. Auve
(74) *Attorney, Agent, or Firm*—Kenyon & Kenyon LLP

(57) ABSTRACT

A data transmission method and a transmission/reception device are described, the data transmission taking place via intermediate memories without the transmitter receiving direct feedback from the receiver regarding the success of the data transmission. Furthermore, at least one transmission and/or reception device is described which forms an interface between at least two control units and has intermediate memories.

17 Claims, 3 Drawing Sheets

METHOD OF DATA TRANSMISSION AND A TRANSMISSION AND RECEPTION DEVICE THEREFOR

FIELD OF THE INVENTION

The present invention relates to a method of data transmission and a transmission and reception device therefor.

BACKGROUND INFORMATION

German Published Patent Application No. 1 01 10 042.6 (not a prior publication) of Mar. 2, 2001 describes a distributed control and analysis system in motor vehicles, where decentralized control units (such as sensors having appropriate electronics for control and/or analysis) are connected to a central control unit via a point-to-point link for data exchange. A data line connects the central control unit to each decentralized unit; both the decentralized control units and the central control unit are designed for transmitting and receiving signals (data). No appropriate configuration of the transmission and reception device or the appropriate method of data transmission between these components is described in the aforementioned document. The preferred application refers to the field of environment sensors in motor vehicles, in particular radar sensor systems.

SUMMARY OF THE INVENTION

Advantageously, data to be transmitted is advantageously temporarily stored in the area of the interface between the central and the decentralized element until it is picked up by the receiving control unit. Having a plurality of intermediate memories through which the data to be transmitted is pushed forward with each pickup operation as in a FIFO memory is particularly advantageous. In this way, the load on the interface, in particular of the transmitting control unit, is reduced.

It is advantageous that no retransmission of data is required if the data is not picked up or if a transmission error occurs. The intermediate memories of the interface are filled sequentially until no more memory location is available. The load on the transmitter is thus reduced.

Furthermore, the transmitting control unit receives no direct feedback on whether or not the transmitted data has been picked up by the receiving control unit. A failed transmission is recognized by a pile-up of transmitted data. The transmitting control unit is unable to transmit further data in this event. This has the advantage that no feedback from receiver to sender is required, which reduces the load on the interface and the components involved. Yet the transmitter receives feedback in the event of a failed transmission. The transmitter learns indirectly through this indirect handshake whether or not the receiver has picked up data.

The data load on the interface is reduced substantially due to the omission of feedback and the omission of retransmission of data. The transmitting and receiving control unit only has to manage transmit and receive operations; therefore the program run time in the particular component is substantially reduced, in particular when the subroutine for access to the interface is called. Also in this way the load on the interface and thus on the components involved is substantially reduced.

In a preferred embodiment, the data transmission method and the data transmission and reception device are used in conjunction with a system for environment sensing in a motor vehicle, where a predefined number of decentralized control units (such as sensors having analysis and control electronics) are connected to a central control unit. The above-described method is particularly well suited for a point-to-point wiring, because it is capable of providing a plurality of interfaces between a central control unit and a plurality of decentralized control units in a simple manner.

However, the interface having the above-mentioned advantages is also well suited as an interface between two individual control units.

It is particularly advantageous that the advantages in communication between control units occur in both directions.

The above-described procedure having the advantage of reducing the load on the interface and the components involved is also used to advantage in other data communication interfaces, both in other automotive applications and in non-automotive applications.

DETAILED DESCRIPTION

Figure 1:
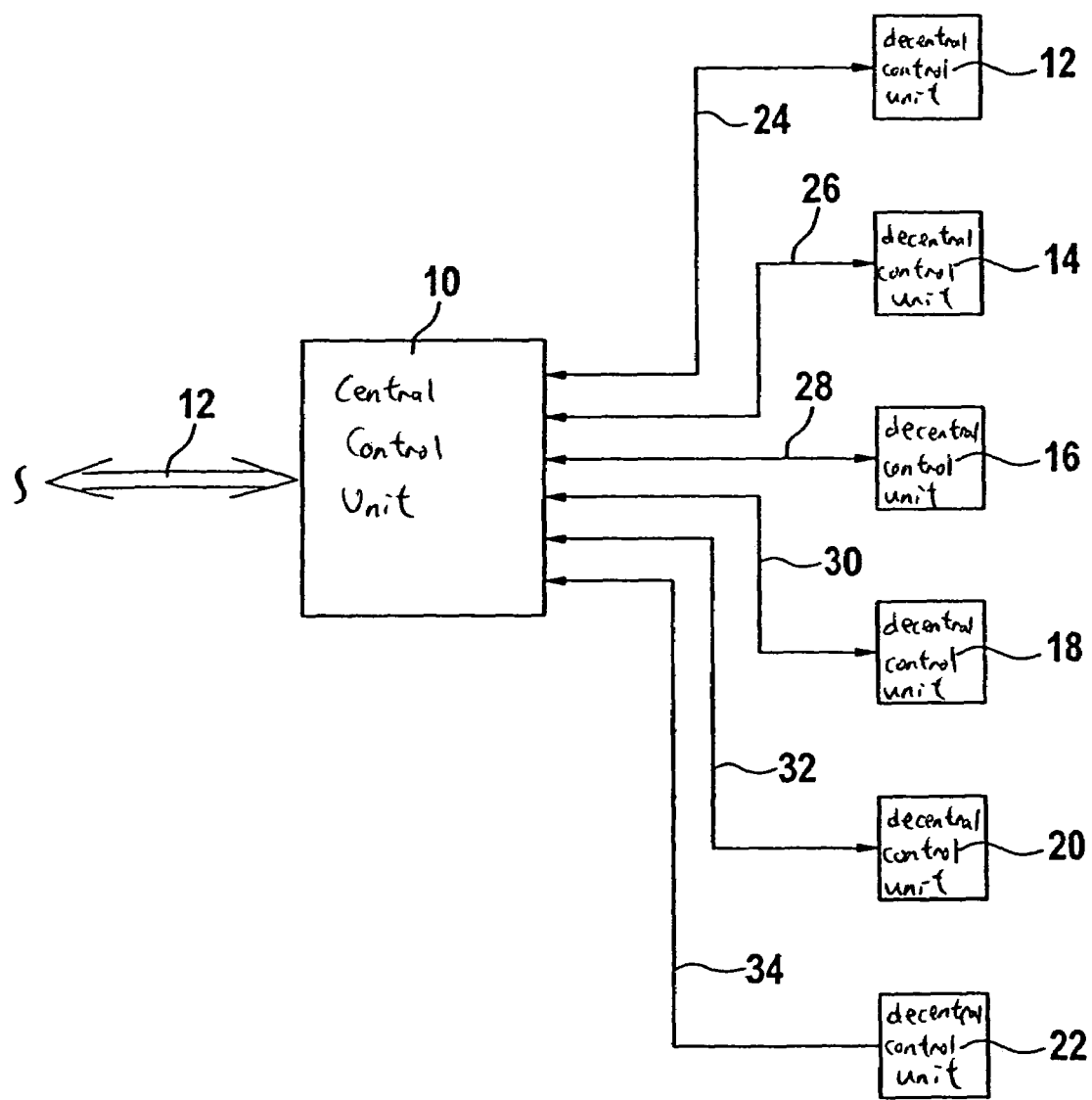
FIG. 1 shows a schematic diagram of a decentralized control system using the example of the preferred application of an environment sensor system based, for example, on radar sensors.

FIG. 1 shows a schematic diagram of a decentralized control system having a central control unit 10, which may be connected to other control units via a data communication system 12. In the example shown, a total of six decentralized control units 12, 14, 16, 18, 20, 22 are connected to central control unit 10 by point-to-point links. A bidirectionally operated interface 24, 26, 28 30, 32, 34 is provided between the central control unit and each decentralized control unit. In the preferred embodiment, this interface is a current-based dual wire interface. Data is exchanged between the central control unit and the decentralized control units via the particular interface, preferably the central control unit both transmitting data to and receiving data from the decentralized control units, and each decentralized control unit transmitting data to and receiving data from the central control unit.

Environment sensing, using radar, infrared or ultrasound sensors, lasers, or video cameras, for example, in motor vehicles represents a preferred field of application. These sensors and thus the decentralized control units are located on the outside of the vehicle, for example, in the bumpers, on the vehicle side, while the central control unit is mounted at a central location, for example, in the vehicle passenger compartment. Thus this is a system having distributed, intelligent components, i.e., components provided with at least one processor. Depending on the application, more or less decentralized control units may be provided. In addition, the procedure described in the following may also be used with any other interface between two control units where data is to be exchanged placing the least possible load on the interface and the components involved. The application is not restricted to environment sensing in motor vehicles, but may also be used in other decentralized systems in motor vehicles, for example, brake systems, engine control systems, etc. or in non-automotive systems.

Figure 2:
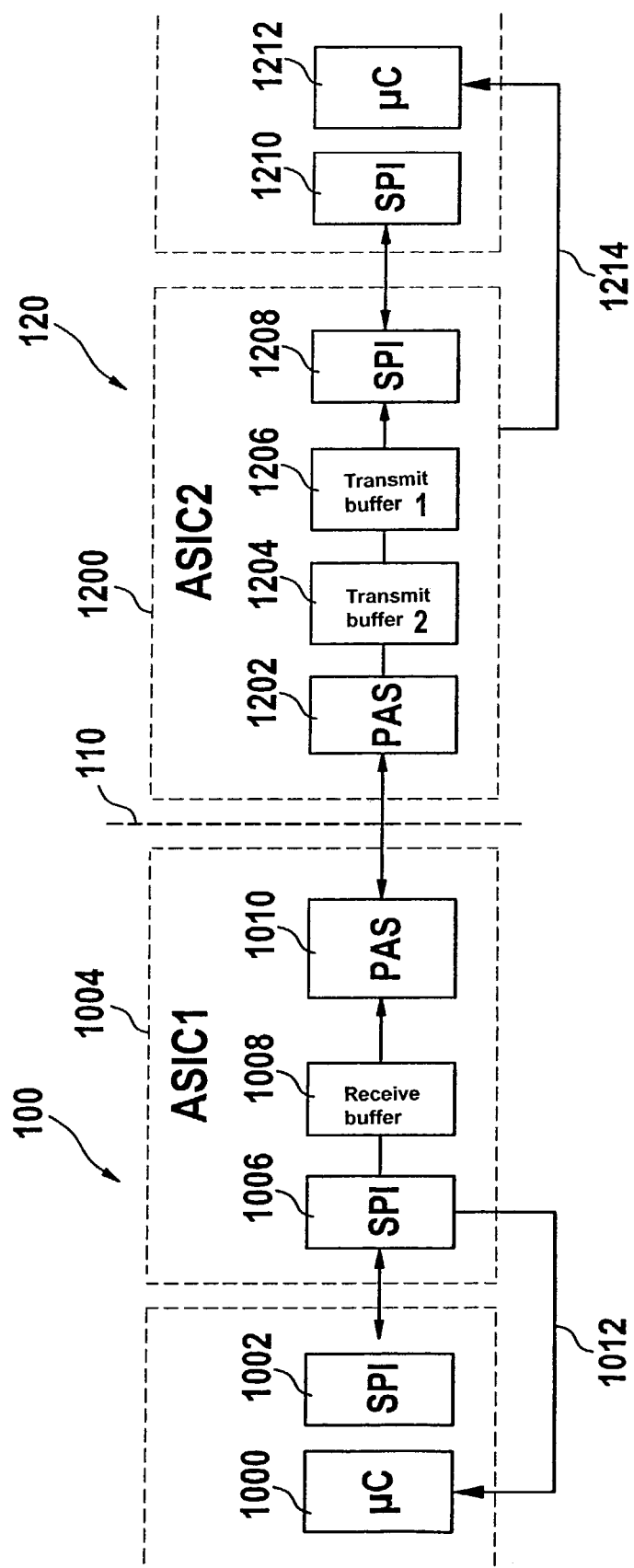
FIG. 2 shows the details of the interface between the central control units and the decentralized control units.

FIG. 2 shows the interface between a first and a second control unit in a preferred configuration in greater detail. FIG. 2 shows central control unit 100, a selected decentralized control unit 120, and interface 110 between the two. The particular control units include at least one processor 1000, which has an SPI interface 1002 among other things. Processor 1000 communicates with a transmitting and/or receiving module 1004 via this interface. Therefore, this module also has an SPI interface 1006 as an interface to processor 1000. Furthermore, the interface module has at least one transmit memory 1008 and a current-based dual wire interface PAS (1010). The above-mentioned elements are hardware elements whose implementation is known per se. The size and number of transmit memories are selected according to the application. In one exemplary application, one transmit memory having a length of one byte has been found adequate. It is to be noted that the SPI interface and/or the PAS interface have their own intermediate memories in one embodiment.

Receiver 1020 on the side of the decentralized unit basically has a transmitting/receiving module 1200, which also has a current-based dual wire interface PAS 1202 for communication with transmitting/receiving module 1004 of the central unit, at least one receive memory 1204, 1206, and an SPI interface 1208, via which the module is connected to an SPI interface 1210 of a processor 1212. The above-mentioned elements are hardware elements whose implementation is known per se. The size and number of receive memories are selected according to the application. In one exemplary application, two receive memories, having a length of one byte each, have been found adequate. It is to be noted that the SPI interface and/or the PAS interface have their own intermediate memories in one embodiment.

For reasons of clarity, the receive side of module 1004 and the transmit side of module 1200 are not shown in FIG. 2. Module 1004 has at least one receive memory (similar to 1204, 1206) for receiving messages, whose input is connected to interface 1010 and whose output is connected to SPI interface 1006. Also in this case, the size and number of receive memories are selected according to the application. In one exemplary application, two receive memories, having a length of one byte each, have been found adequate, with the SPI interface and the PAS interface having their own intermediate receive memories in one embodiment. Module 1200 has at least one transmit memory (similar to 1008) for transmitting messages, whose input is connected to interface 1208 and whose output is connected to interface 1202. Also in this case, the size and number of transmit memories are selected according to the application. In one exemplary application, one transmit memory, having a length of one byte, has been found adequate, with the SPI interface and/or the PAS interface having their own intermediate transmit memories in one embodiment.

Furthermore, a data link 1012 is provided between module 1004 and processor 1000 and a data link 1014 is provided between module 1200 and processor 1212, over which data links the particular processor receives information from the module on the data received and to be picked up.

FIG. 2 shows the interface between central control unit 100 and a selected decentralized control unit 120. In the preferred embodiment, a plurality of decentralized control units are provided, so that each of the decentralized control units includes a module such as module 1200, and has a preferably current-based interface to module 1004. Depending on the number of decentralized control units to be served, this module includes current-based interfaces, transmit memories, receive memories, etc., but only one SPI interface to processor 1000.

In the preferred embodiment, modules 1004 and 1200 are ASICs, which include at least the elements illustrated and whose function sequence explained below is hard wired. The number of transmit and receive memories varies according to the application, so that, for example, three receive memories and two transmit memories, one receive memory and two transmit memories, etc. may be provided for each channel. The length of the buffer memory depends on the length of the data to be transmitted and may be one byte or more depending on the embodiment.

Figure 3:
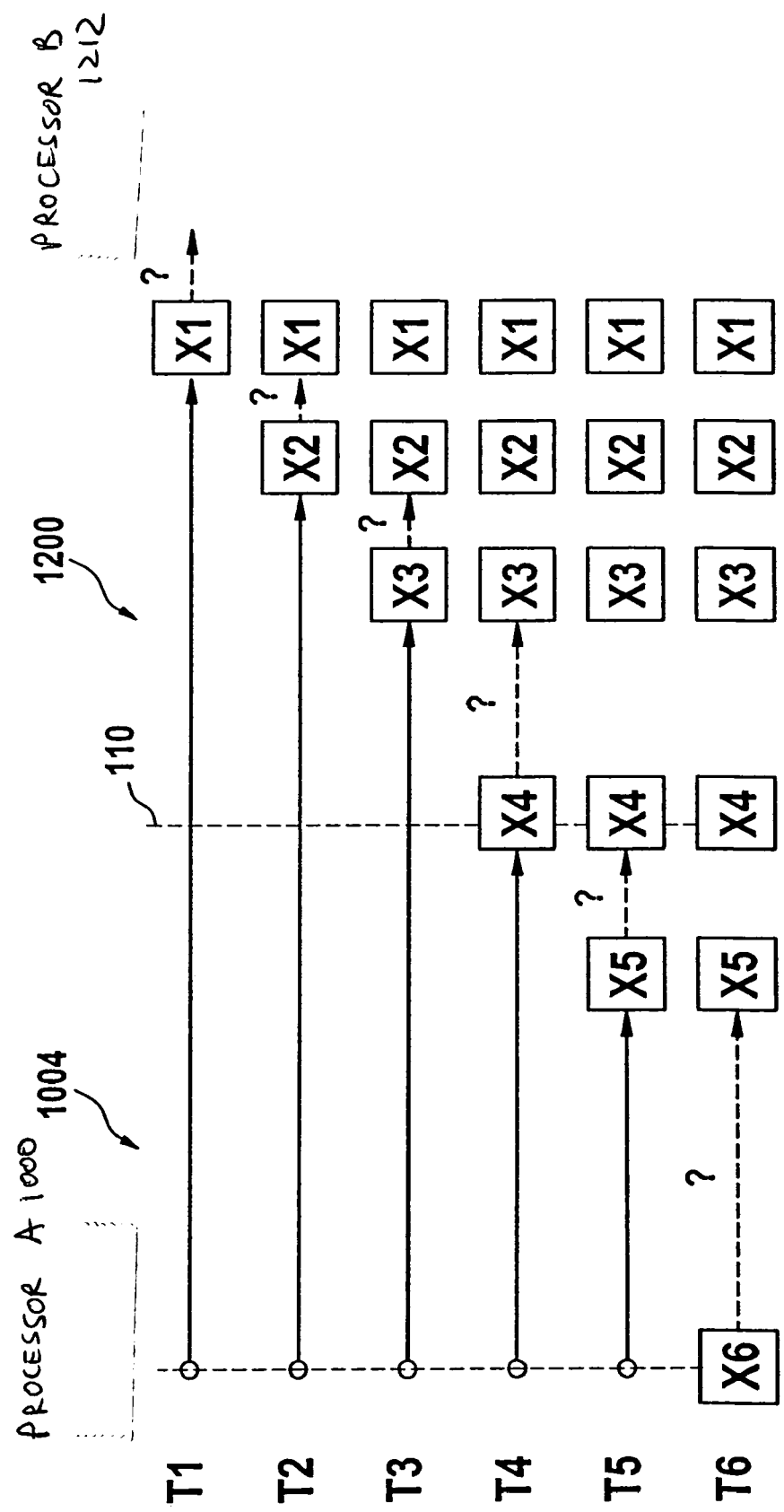
FIG. 3 shows the response of the interface in the event of a data pile-up.

FIG. 3 shows, using an example, a transmit sequence from the central control unit to a decentralized control unit in which a data pile-up occurs because the decentralized control unit does not pick up the transmitted data. The sequence in modules 1004 and 1200 for such a transmission operation is shown. The handling is hard wired in the modules.

At time T1, processor 1000 transmits data X1 to module 1004 via its SPI interface. Module 1004 loads this data, since its memories are free, via the PAS interface into module 1200, which stores the data in free receive memory 1206. At the same time, the module transmits to computer 1212 the information that data is available for pickup. The memory is not emptied until processor 1212 picks up the data. At the next point in time X2 in the cycle, processor 1000 transmits additional data X2 in the same manner. Assuming that processor 1212 has not picked up data X1, data X2 remains in receive memory 1204. It is only forwarded when the next memory is free. Since this is not the case, the data is not forwarded. At time T3, the next data X3 is transmitted by processor 100 via the interface. This data is stored in the memory of PAS interface 1202 of module 1200. Now three memories are full because no data was picked up. Data X3 is not forwarded because processor 1212 did not pick up data X2 and X1.

At time T4, processor 1000 transmits data X4, which remains pending in a transmit memory of PAS interface 1010 of module 1004, since all receive memories of module 1200 are full. Module 1200 reports to module 1004 that all memories are full. Therefore, module 1004 stores the data in its memories. At time T5, processor 1000 transmits data X5, which remains in transmit memory 1008 of module 1004. This memory is not emptied until the PAS memory is free. At time T6, processor 1000 receives the message from module 1004 that all memories are full, so that no transmission is possible. Consequently, microcomputer 1000 recognizes that the data transmission has failed, and data X6 is retransmitted at a later time.

Thus, this pile-up condition shows an indirect handshake of the data transmission in which no feedback to the transmitter occurs if the data transmission is successful, and feedback occurs after a certain number of transmissions if the transmission is unsuccessful.

If the processor has read data X1, data X2 through X5 are pushed forward by one memory location, so as to enable the transmission of data X6. Processor 1000 is informed thereof by the message "all memories full" being reset. Normally not all memories are full. The transmitted data is entered in the last free memory in the direction of operation and is pushed forward to the next one when the latter becomes free until the receive processor it.

Transmission of data from the decentralized control unit to the central control unit takes place in a similar manner.

What is claimed is:

1. A method of data transmission between a first control unit and a second control unit, comprising:
   transmitting data from the first control unit to the second control unit; and
   causing one of the first control unit and the second control unit serving as a transmitting unit to determine that an unsuccessful data transmission operation to a receiver has occurred due to further transmission of data being no longer possible after transmitting a certain number of data, wherein no communication is sent from the receiver acknowledging that the unsuccessful transmission has occurred.

2. The method as recited in claim 1, wherein:
   memories in which transmitted data are stored are provided in the first control unit and the second control unit in a transmission path.

3. The method as recited in claim 2, wherein:
   further transmission of data is no longer possible when all memories of the transmission path are occupied by transmitted data.

4. The method as recited in claim 2, wherein:
   the receiver transmits a message to a transmitter informing the transmitter that the memories of the receiver are full.

5. The method as recited in claim 1, wherein:
   memories are available on a transmit side and a receive side.

6. A method of data transmission between a first control unit and a second control unit, comprising:
   transmitting data from the first control unit to the second control unit:
   causing one of the first control unit and the second control unit serving as a transmitting unit to receive feedback on an unsuccessful data transmission operation to a receiver due to further transmission of data being no longer possible after transmitting a certain number of data; and
   causing the second control unit serving as a receiving unit to read out data stored in a last memory of the transmission path, the data stored in a next to last memory being then loaded into the last memory when the last memory is free, and the data from the third to last memory are loaded into the next to last memory, wherein:
      memories in which transmitted data are stored are provided in the first control unit and the second control unit in a transmission path, and
      further transmission of data is no longer possible when all memories of the transmission path are occupied by transmitted data.

7. The method as recited in claim 6, wherein:
   if the last memory is filled again, a processor of the receiving unit receives information on data to be picked up.

8. A device for at least one of data transmission and data reception, comprising:
   at least one interface to at least one additional device for at least one of data reception and data transmission; and
   a structure including at least one of at least one transmit memory and at least one receive memory in which data that has been at least one of transmitted and received are stored until a transmission channel is free, wherein:
      the transmission channel is free when received data are picked up, and
      no communication is sent from the at least one additional device acknowledging that an unsuccessful transmission has occurred.

9. The device as recited in claim 8, wherein:
   the device is designed as an ASIC that is a component of a control unit having a microprocessor.

10. The device as recited in claim 8, further comprising:
    at least one current-based dual wire interface; and
    a Serial Peripheral Interface, the at least one current-based dual wire interface and the Serial Peripheral Interface connecting the device to a processor of a control unit.

11. The device as recited in claim 10, wherein:
    the at least one current-based dual wire interface includes a plurality of current-based dual wire interfaces.

12. The device as recited in claim 8, wherein:
    the device, upon receiving data, transmits a message to an associated processor regarding data to be picked up.

13. The device as recited in claim 8, further comprising:
    a plurality of memories; and
    an arrangement for transmitting, if all of the memories are full, a message indicating that all of the memories are full.

14. A method of data transmission between a first control unit and a second control unit, one of the first control unit and the second control unit serving as a transmitting unit and the other as a receiving unit, comprising:
    storing data to be transmitted in a transmit memory of the transmitting unit until a transmission channel is clear, the data remaining pending in the transmit memory of the transmitting unit when the transmission channel is not free, and the transmitting unit recognizing that data transmission has failed when the data remains pending in the transmit memory, wherein no communication is sent from the receiving unit acknowledging that an unsuccessful data transmission has occurred.

15. A method according to claim 14, further comprising:
    storing the data received in at least one receive memory of the receiving unit until the data is picked up, the data remaining pending in the receive memory of the receiving unit when the data is not picked up; and
    generating a message that the at least one receive memory is full indicating that the transmission channel is not free.

16. A device for data transmission according to claim 14, further comprising:
    a structure including at least one receive memory in which data that has been received are stored until the data are picked up, wherein
    the data remains pending in the receive memory of the receiving unit when the data is not picked, and
    a message is generated that the at least one receive memory is full indicating that the transmission channel is not free.

17. A device for data transmission, comprising:
    a transmitter having at least one interface to at least one additional device for data transmission; and
    a structure including at least one transmit memory in which data that has been transmitted are stored until a transmission channel is free, wherein the data remaining pending in the transmit memory of the transmitting unit when the transmission channel is not free, and
    the transmitting unit recognizes that data transmission has failed when the data remains pending in the transmit memory, wherein no communication is sent from a receiver acknowledging that an unsuccessful data transmission has occurred.

* * * * *